(12) United States Patent
Rheaume

(10) Patent No.: US 12,060,739 B2
(45) Date of Patent: *Aug. 13, 2024

(54) HINGE ASSEMBLY

(71) Applicant: MHI RJ Aviation ULC, Boisbriand (CA)

(72) Inventor: Michel Rheaume, Saint Hippolyte (CA)

(73) Assignee: MHI RJ Aviation ULC, Boisbriand (CA)

(*) Notice: Subject to any disclaimer, the term of this patent is extended or adjusted under 35 U.S.C. 154(b) by 68 days.

This patent is subject to a terminal disclaimer.

(21) Appl. No.: 17/931,299

(22) Filed: Sep. 12, 2022

(65) Prior Publication Data

US 2023/0003066 A1 Jan. 5, 2023

Related U.S. Application Data

(63) Continuation of application No. 16/471,122, filed as application No. PCT/IB2017/057912 on Dec. 13, 2017, now Pat. No. 11,566,460.

(60) Provisional application No. 62/436,556, filed on Dec. 20, 2016.

(51) Int. Cl.
*E05D 15/46* (2006.01)
*B64D 11/00* (2006.01)

(52) U.S. Cl.
CPC .......... *E05D 15/463* (2013.01); *B64D 11/003* (2013.01)

(58) Field of Classification Search
CPC ..... E05D 15/401; E05D 15/463; E05D 13/10; E05D 3/06; E05D 5/02; B64D 11/003; E05F 3/20; E05F 3/224; E05F 1/1292; E05F 1/1091; E05Y 2900/502; E05Y 2900/538; E05Y 2201/264; E05Y 2201/21
See application file for complete search history.

(56) References Cited

U.S. PATENT DOCUMENTS 4,138,988 A 2/1979 Hurley
4,383,347 A 5/1983 La Conte
4,383,392 A 5/1983 La Conte
(Continued)

FOREIGN PATENT DOCUMENTS

CN 105813940 A 7/2016
WO 2007048914 A1 5/2007
(Continued)

OTHER PUBLICATIONS

The First Office Action issued in corresponding Chinese Patent Application No. 201780078691.9, issued on May 7, 2022 (17 pages).
(Continued)

*Primary Examiner* — William L Miller
(74) *Attorney, Agent, or Firm* — Osha Bergman Watanabe & Burton LLP

(57) ABSTRACT

A hinge assembly for receiving a door includes: a wall including a wall body defining an inner surface, and an outer surface that is opposed to the inner surface, and a wall panel extending from one of the inner surface and the outer surface and defining part of a perimeter of an opening closable by the door; a pivot connected to the wall panel and defining a pivot axis intersecting the wall panel; and a hinge arm having a portion engaged to the pivot and extending away from the wall panel.

19 Claims, 7 Drawing Sheets

(56) References Cited

U.S. PATENT DOCUMENTS

| | | |
|---|---|---|
| 5,409,308 A | 4/1995 | Reuter |
| 5,567,028 A | 10/1996 | Lutovsky |
| 6,045,204 A | 4/2000 | Frazier |
| 6,398,163 B1 | 6/2002 | Welch |
| 9,327,834 B2 | 5/2016 | Paulino |
| 9,878,791 B2 | 1/2018 | Kammerer |
| 10,106,258 B2 | 10/2018 | Kammerer |
| 10,315,768 B2 | 6/2019 | Schörkhuber |
| 10,364,032 B2 | 7/2019 | Kammerer |
| 10,760,315 B2 | 9/2020 | Chadwell |
| 10,801,244 B1 * | 10/2020 | Chadwell ................ E05D 3/06 |
| 11,352,823 B2 * | 6/2022 | Chadwell ............ B64D 11/003 |
| 2003/0080247 A1 | 5/2003 | Frazier |
| 2003/0116988 A1 | 6/2003 | Stelandre et al. |
| 2005/0040287 A1 | 2/2005 | Stephan et al. |
| 2005/0264144 A1 | 12/2005 | Verbeek |
| 2014/0197721 A1 | 7/2014 | Savian |
| 2014/0246968 A1 | 9/2014 | Geng |
| 2014/0283336 A1 | 9/2014 | Cloud |
| 2015/0307192 A1 | 10/2015 | Savian |
| 2016/0083090 A1 | 3/2016 | Savian |
| 2016/0114889 A1 | 4/2016 | Kearsey |
| 2017/0066533 A1 | 3/2017 | Long |
| 2017/0137130 A1 | 5/2017 | Kammerer |
| 2017/0283058 A1 | 10/2017 | Papke |
| 2018/0050801 A1 | 2/2018 | Savian |
| 2018/0209197 A1 | 7/2018 | Williams |
| 2018/0319501 A1 | 11/2018 | Schörkhuber |
| 2019/0017308 A1 | 1/2019 | Chadwell |
| 2021/0040786 A1 | 2/2021 | Heimbach |

FOREIGN PATENT DOCUMENTS

| | | |
|---|---|---|
| WO | 2008012427 A1 | 1/2008 |
| WO | 2016007915 A1 | 1/2016 |

OTHER PUBLICATIONS

PCT International Search Report and Written Opinion dated Mar. 6, 2018 in corresponding International Application No. PCT/IB2017/057912 (13 pages).

* cited by examiner

HINGE ASSEMBLY

CROSS-REFERENCE TO RELATED APPLICATIONS

The present application is a continuation application of and, thereby, claims benefit under 35 U.S.C. § 120 to U.S. patent application Ser. No. 16/471,122 filed on Jun. 19, 2019, titled "HINGE ASSEMBLY," which claims benefit to International Patent Application No. PCT/IB2017/057912, filed on Dec. 13, 2017, which claims priority from U.S. provisional application No. 62/436,556 filed Dec. 20, 2016. The contents of the priority applications are incorporated by reference in their entirety.

TECHNICAL FIELD

The application relates generally to a hinge assembly and, more particularly, to a hinge assembly for retaining a door of a storage bin.

BACKGROUND

Overhead bins in aircraft cabins typically have door hinges which are received within the storage space of the bins, for example attached to an inner surface of the bin walls. The hinges accordingly reduce the available storage space within the bin, and accordingly the amount of luggage which can be stored within the bin.

SUMMARY

In one aspect, there is provided a hinge assembly for receiving a door, the hinge assembly comprising: a wall having opposed inner and outer surfaces, an edge of the wall including two spaced apart wall panels extending from a respective one of the inner and outer surfaces, the wall panels defining part of a perimeter of an opening closable by the door; a pivot located between the wall panels, the pivot defining a pivot axis intersecting the wall panels; and a hinge arm having a portion received between the wall panels and engaged to the pivot, the hinge arm extending away from the wall panels and configured for attachment to the door, the hinge arm pivotable about the pivot axis to be movable between open and closed positions of the door, the hinge arm movable between the open and closed position within a plane extending between the opposed inner and outer surfaces.

In particular embodiments, the hinge assembly can include any one or any combination of the following:
the wall includes a wall body defining the inner and outer surfaces, and the wall panels are detachably connected to the wall body on a respective one of the inner and outer surfaces;
the wall body includes honeycomb material;
the wall body and wall panels include different materials;
the wall panels are interconnected in a monolithic manner, or the wall panels are detachably interconnected;
a first stop abutting the hinge arm in the closed position and a second stop abutting the hinge arm in the open position;
a damper pivotally connected to the hinge arm and to at least one of the wall panels.

In another aspect, there is provided a storage bin comprising: a bin body defining a storage space and an opening for accessing the storage space, the bin body including a wall having an inner surface within the storage space and an opposed outer surface outside of the storage space, an edge of the wall including two spaced apart wall panels extending from a respective one of the inner and outer surfaces and defining part of a perimeter of the opening; a pivot located between the wall panels, the pivot defining a pivot axis intersecting the wall panels; a hinge arm having a portion located between the wall panels and engaged to the pivot, the hinge arm extending away from the wall panels, the hinge arm pivotable about the pivot axis to be movable within a plane aligned with the wall; and a door engaged to the hinge arm, wherein pivoting of the hinge arm moves the door between a closed position where the door closes the opening and an open position where the door is away from the opening and the opening is accessible.

In particular embodiments, the storage bin can include any one or any combination of the following:
the wall includes a wall body defining the inner and outer surfaces, and the wall panels are detachably connected to the wall body on a respective one of the inner and outer surfaces;
the wall body includes honeycomb material;
the wall body and wall panels include different materials;
the plane of the hinge arm is vertical and the door moves upwardly from the closed position to the open position;
the wall panels are interconnected in a monolithic manner, or the wall panels are detachably interconnected;
a first stop abutting the hinge arm in the closed position and a second stop abutting the hinge arm in the open position;
a damper pivotally connected to the hinge arm and to at least one of the wall panels.

In a particular embodiment, the wall is a first wall, the bin body including a second wall opposite the first wall, the second wall having an inner surface within the storage space and an opposed outer surface outside of the storage space, an edge of the second wall including two additional spaced apart wall panels, the bin further comprising an additional pivot located between the additional wall panels, and an additional hinge arm having a portion located between the additional wall panels and engaged to the additional pivot, the additional hinge arm extending away from the additional wall panels and engaged to the door, the additional hinge arm pivotable about the pivot to be movable within an additional plane aligned with the additional wall.

In a further aspect, there is provided a method of connecting a door to a wall, the method comprising: defining a receiving space along an edge of a wall defining part of a perimeter of an opening to be closed by the door; pivotally connecting a hinge arm to a pivot extending within the receiving space so that the hinge arm is pivotable within a plane aligned with the wall; and connecting the door to the hinge arm.

In a particular embodiment, the wall is a first wall, and the method further comprises: defining an additional receiving space along an edge of a second wall opposite the first wall; pivotally connecting an additional hinge arm to an additional pivot extending within the additional receiving space so that the additional hinge arm is pivotable within an additional plane aligned with the second wall; and connecting the door to the additional hinge arm.

BRIEF DESCRIPTION OF THE DRAWINGS

For a better understanding of the present invention, as well as other aspects and further features thereof, reference is made to the following description which is to be used in conjunction with the accompanying drawings, where.

Figure 1:
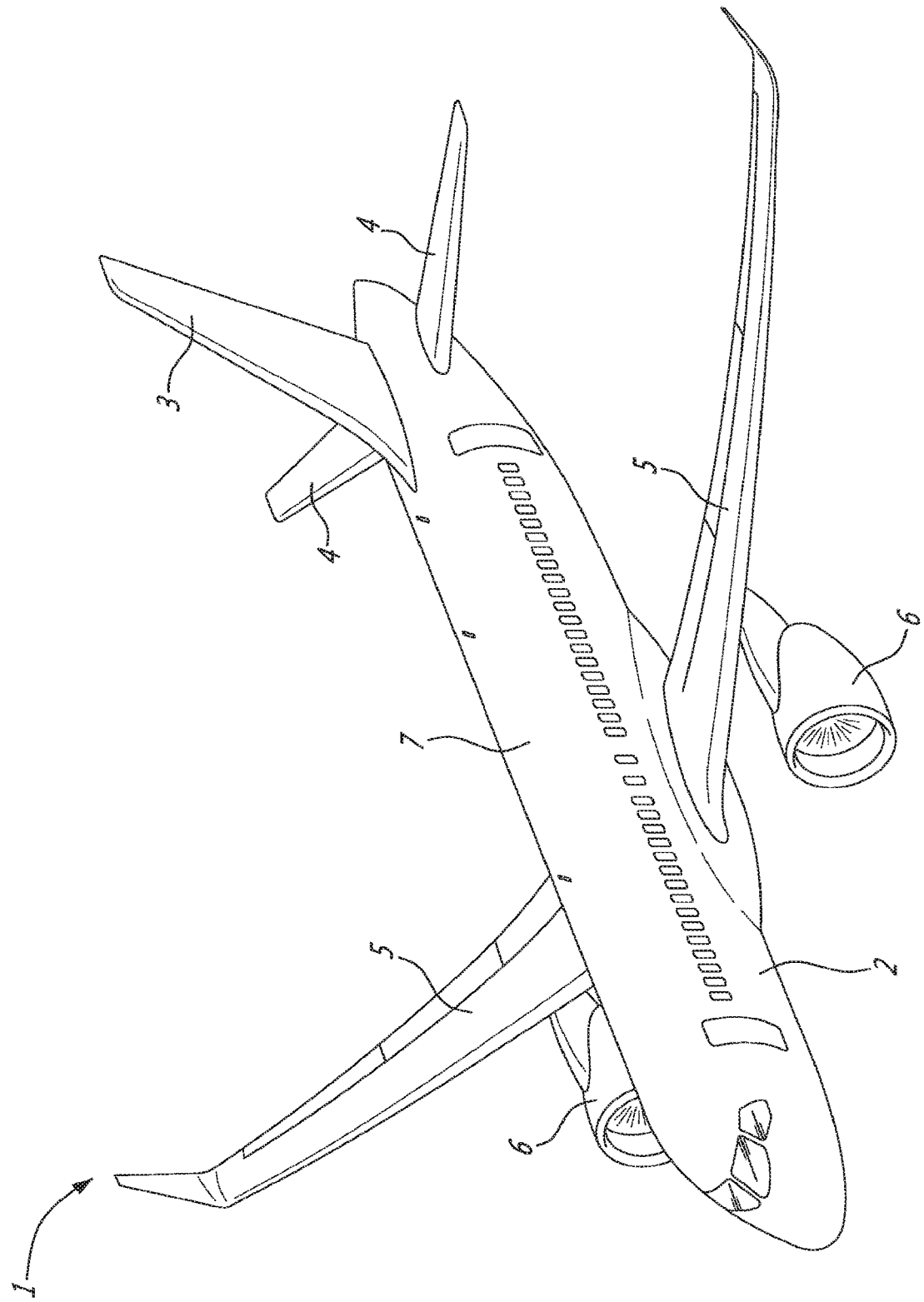
FIG. 1 is a schematic tridimensional view of an aircraft in accordance with a particular embodiment.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin 7 generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
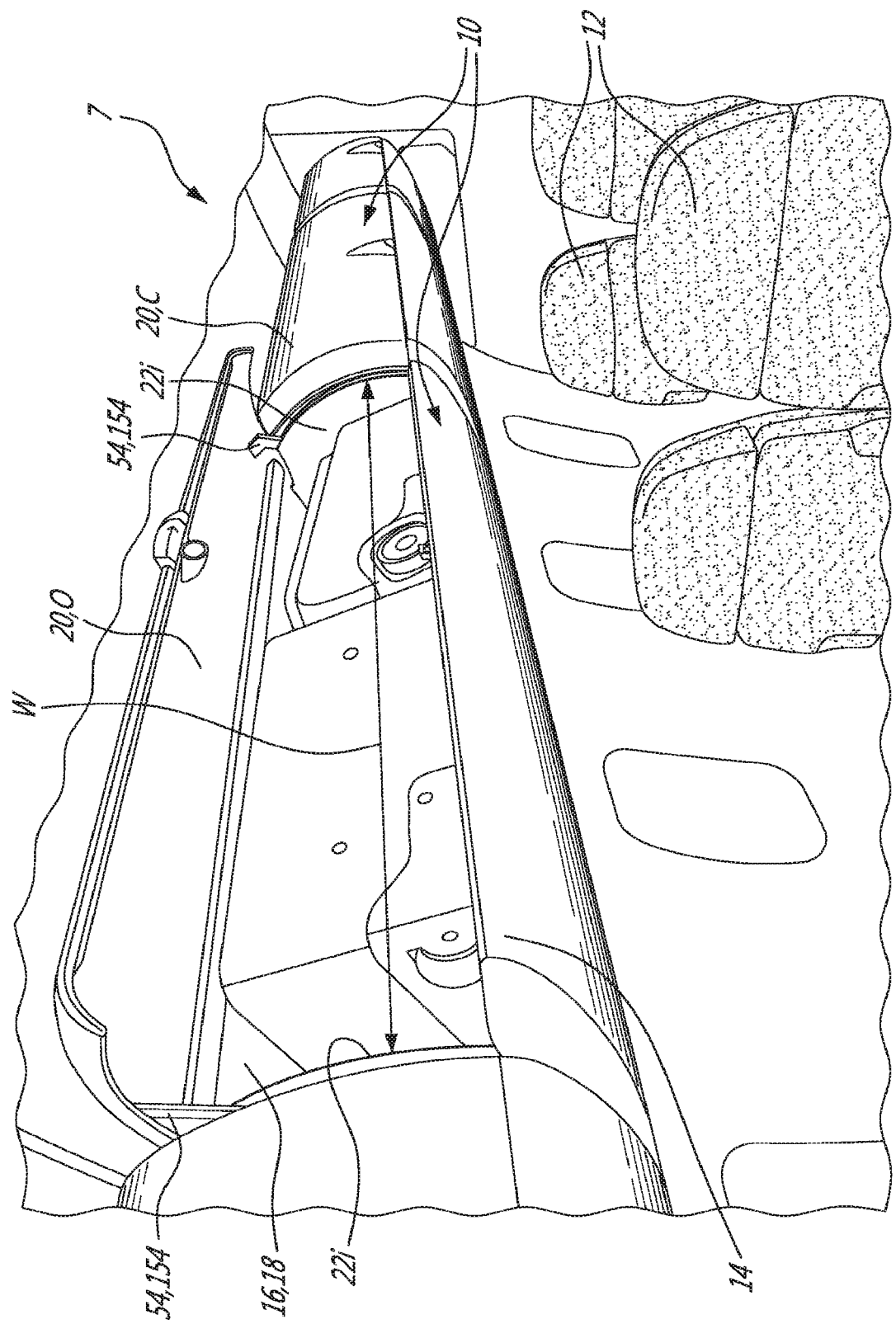
FIG. 2 is a tridimensional view of part of a cabin of an aircraft such as shown in FIG. 1, showing overhead bins with doors in open and closed positions.

Referring to FIG. 2, the aircraft cabin 7 includes storage bins 10, which are configured as overhead storage bins located over passenger seats 12 in the example shown. Each storage bin 10 includes a bin body 14 defining a storage space 16 (for e.g. luggage) and an opening 18 for accessing the storage space 16. The storage bin 10 includes a door 20 pivotable between a closed position C where the door 20 closes the opening 18 and an open position O where the door 20 is away from the opening 18 and the opening 18 is accessible. It is understood that the particular configuration shown for the bin 10 is exemplary only and that any other suitable configuration may alternately be used.

Referring to FIGS. 3-6, the storage bin 10 includes a plurality of walls 22 which have an inner surface 22i (FIGS. 5-6) located within the storage space 16 and an opposed outer surface (FIGS. 3-4 and 6) located outside of the storage space 16. The dimensions of the storage space 16 are thus defined between the inner surface 22i of the walls 22. For example, a width W (FIG. 2) of the storage space 16 is defined between the inner surfaces 22i of the opposed side walls 22.

Still referring to FIGS. 3-6, a hinge assembly 30 in accordance with a particular embodiment is shown. The hinge assembly 30 is configured for receiving the door 20 to allow movement of the door 20 between the open and closed positions.

One wall 22 of the bin body 14, which in the embodiment shown is a side wall, has an edge including two spaced apart wall panels: an inner wall panel 32 (omitted from FIG. 5) extending from the inner surface 22i of the wall 22, and an outer panel 34 (omitted from FIG. 4) extending from the outer surface 22o of the wall 22. The wall panels 32, 34 define part of the perimeter of the opening 18 of the storage bin 10.

Figure 4:
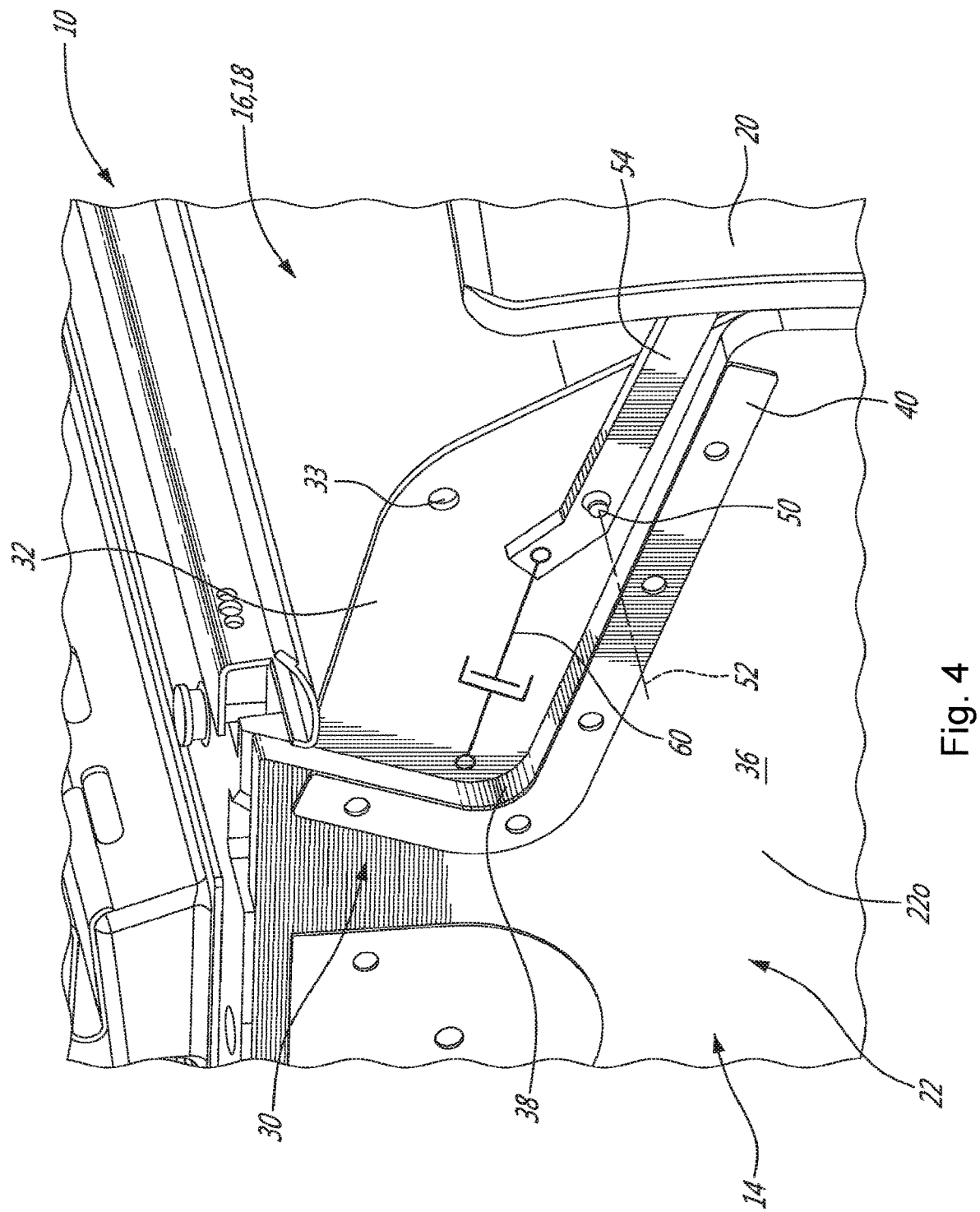
FIG. 4 is a tridimensional view of part of the hinge assembly of FIG. 3, with an outer wall panel thereof removed.
Figure 5:
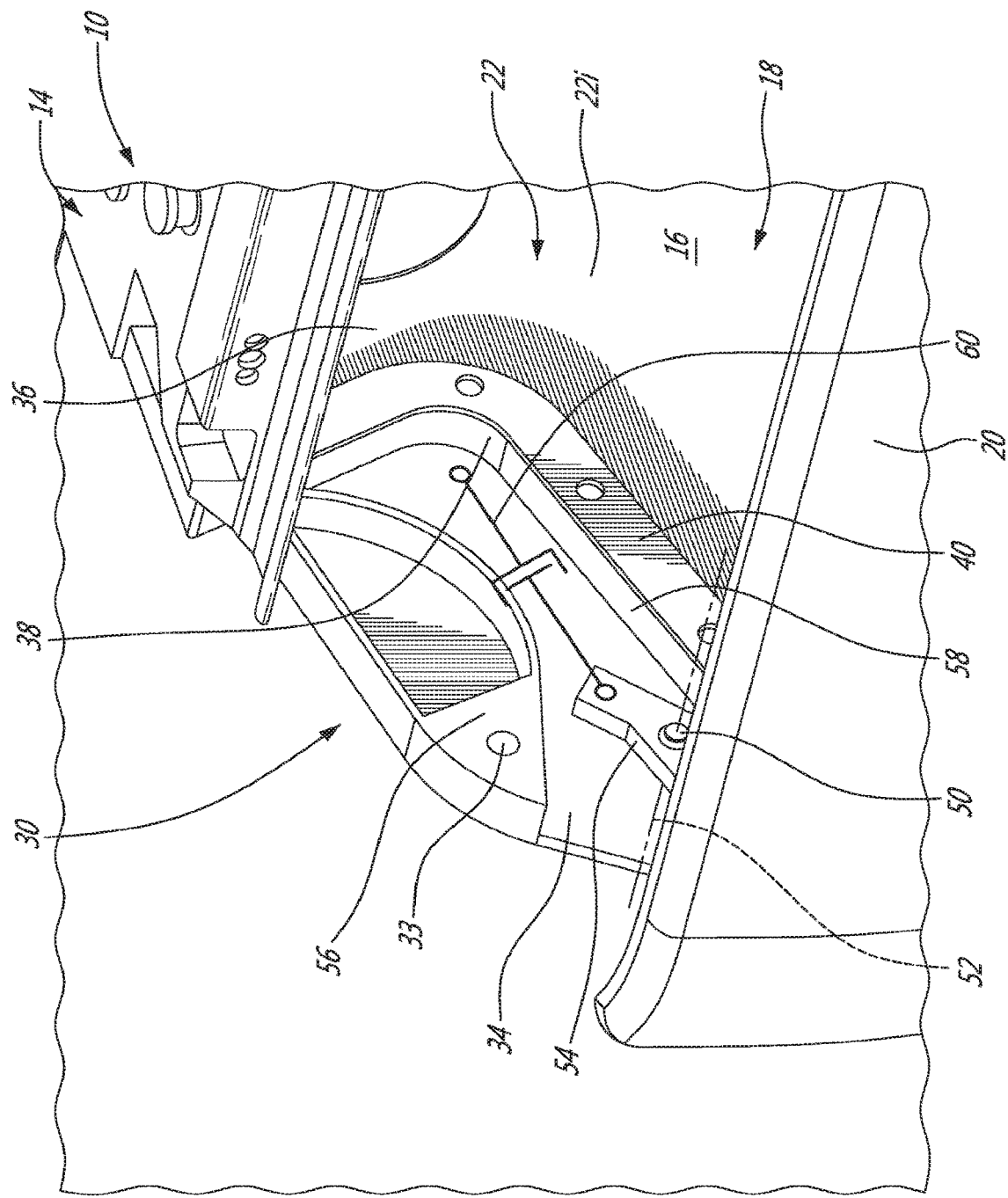
FIG. 5 is a tridimensional view of part of the hinge assembly of FIG. 3, with an inner wall panel thereof removed.

In the embodiment shown, the wall 22 includes a wall body 36 defining the inner and outer surfaces 22i, 22o. A cut-out 38 ("cutout surface," FIGS. 4-5) is defined along the edge of the wall body 36. The inner wall panel 32 is detachably connected to the inner surface 22i of the wall body 36 along the edge of the cut-out 38, and the outer wall panel 34 is detachably connected to the outer surface 22o of the wall body 36 along the edge of the cut-out 38. Seals 40 may optionally be provided between the wall panels 32, 34 and the respective surface 22i, 22o of the wall body 36 along their connection. As can be best seen in FIG. 6, the wall panels 32, 34 are connected to the wall body 36 by a plurality of fasteners 42 extending through the wall body 36 and the wall panels 32, 34. Other suitable types of connections may alternately be used, including detachable connections (i.e. connections which are detachable without causing damage to the wall body 36 and the wall panels 32, 34), and permanent connections (i.e. connections which are not detachable without causing damage to one or both of the wall body 36 and the wall panels 32, 34). In the embodiment shown, the two wall panels 32, 34 are also detachably connected to each other, for example through complementary clips or suitable fasteners 33 (FIGS. 4-5).

Figure 3:
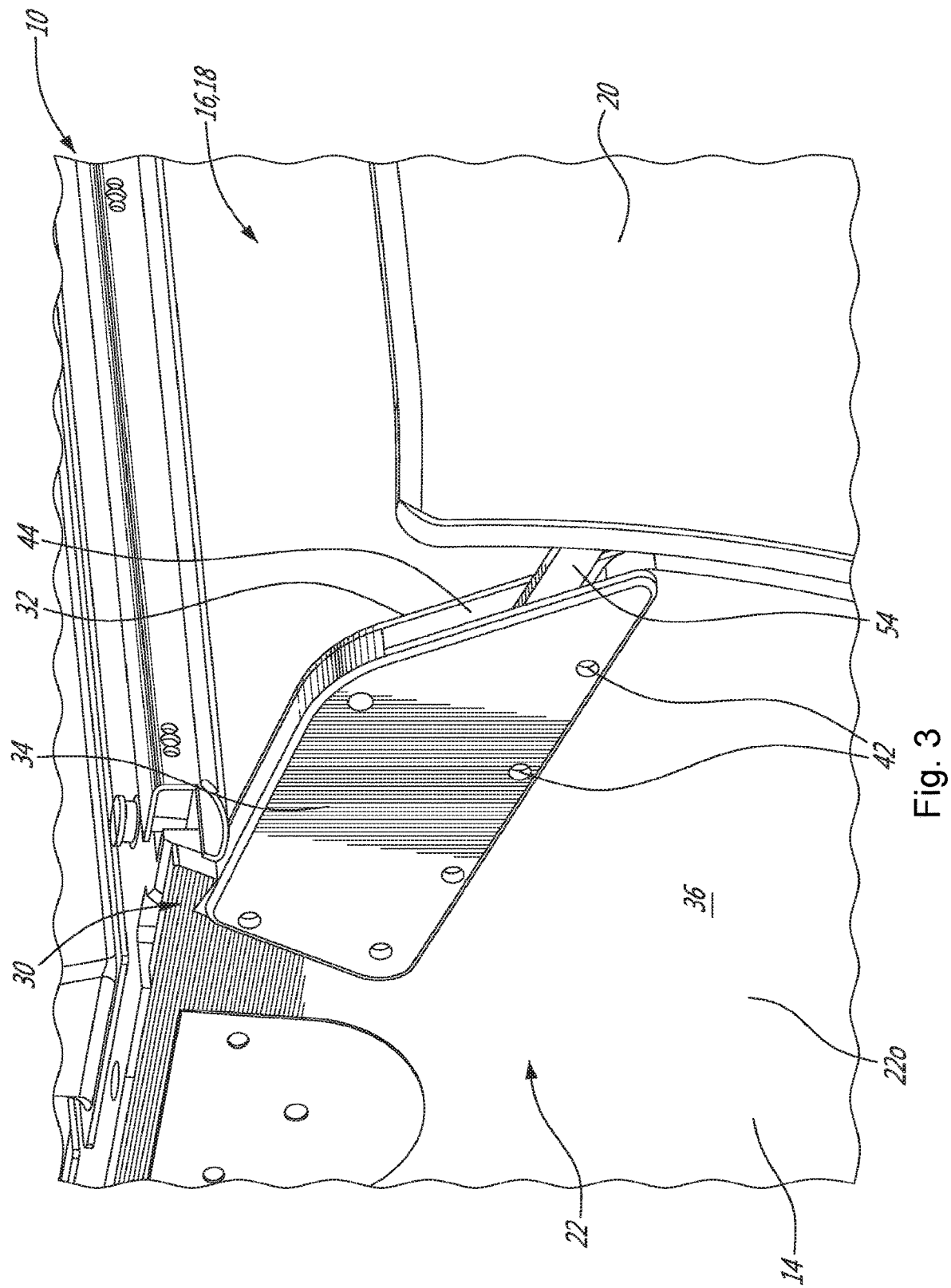
FIG. 3 is a tridimensional view of a hinge assembly in accordance with a particular embodiment which may be used with the overhead bins of FIG. 2.
Figure 6:
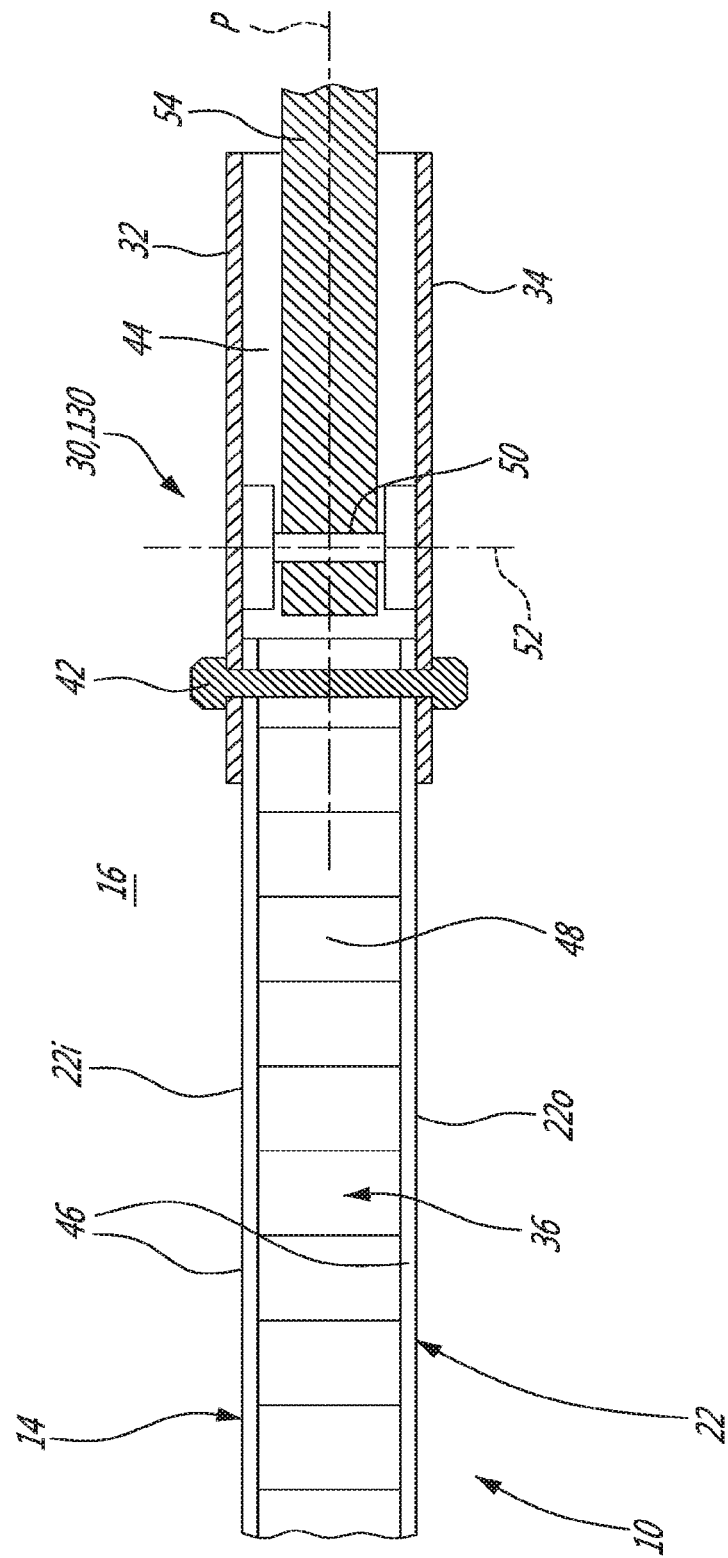
FIG. 6 is a cross-sectional view of part of the hinge assembly of FIG. 3, in accordance with a particular embodiment.

The wall panels 32, 34 thus extend from the edge of the cut-out 38 to complete the perimeter of the opening 18 of the storage bin 10. Referring to FIGS. 3 and 6, a receiving space 44 is accordingly defined between the wall panels 32, 34, bordered by the cut-out edge of the wall body 36.

In a particular embodiment, the wall body 36 and wall panels 32, 34 include different materials. Referring back to FIG. 6, in a particular embodiment, the wall body 36 includes inner and outer panels 46, made for example of fiberglass composite material, interconnected by a honeycomb core 48, and the wall panels 32, 34 include a plastic material suitable for injection molding. Other configurations and materials are of course possible.

Alternately, the wall panels 32, 34 may be defined by an integral part of the wall body 36, for example by a portion of the inner and outer panels 46 extending beyond the core 48.

As can be seen in FIGS. 4-6, the assembly 30 includes a pivot 50 located in the receiving space 44 defined between the wall panels 32, 34. The pivot 50 defines a pivot axis 52 intersecting the wall panels 32, 34; in the embodiment shown, the pivot axis 52 extends perpendicularly to the inner and outer wall surfaces 22i, 22o. In the embodiment shown, the pivot 50 is connected to both wall panels 32, 34.

The hinge assembly 30 further includes a hinge arm 54 having a portion located in the receiving space 44 between the wall panels 32, 34 and engaged to the pivot 50. The hinge arm 54 has a rigid structure, and is pivotable about the pivot axis 52 to move between the open and closed positions of the door 20. The hinge arm 54 extends away from the wall panels 32, 34 for connection to the door 20. Throughout its pivoting motion, the hinge arm 54 remains within a space defined between a plane of the inner surface 22i of the wall 22 and a plane of the outer surface 22o of the wall 22. In other words, the hinge arm 54 pivots in plane P (FIG. 6) which is aligned with the wall 22, i.e. a plane P extending between the inner and outer surfaces 22i, 22o of the wall 22 at least in proximity of the opening 18, and in a particular embodiment for the entirety of the wall 22.

In the embodiment shown, the plane P of movement of the hinge arm 54 is vertical, and the door 20 moves upwardly from the closed position to the open position. Other configurations are also possible.

The hinge arm 54 is connected to the door 20 using any suitable type of connection. For example, in a particular embodiment the hinge arm 54 includes a connection portion extending parallel to the door 20, having a U-shaped cross-section which defines a recess sized to receive an edge of the door 20, and the edge of the door 20 is slidingly engaged in this complementary recess (not shown). Other configurations are also possible.

In the embodiment shown and referring to FIG. 5, the outer wall panel 34 defines a stop 56 for abutting the hinge arm 54 when the door 20 is in the open position. The cut-out edge of the wall body 36 defines another stop 58 for abutting the hinge arm 54 when the door 20 is in the closed position. Alternately, one or both of the stops 56, 58 may be defined by the inner wall panel 32, or both stops 56, 58 may be defined by the outer wall panel 34.

As can be seen in FIG. 4-5, a damper 60 is pivotally connected to the hinge arm 54 and to one or both of the wall panels 32, 34, and is located in the receiving space 44 between the wall panels 32, 34. The hinge arm 54 is configured so that its connection with the damper 60 and its connection with the pivot 50 are appropriately spaced apart to allow the damper 60 to act on the motion of the hinge arm 54 about the pivot 50. In the embodiment shown, the damper 60 biases the door 20 in the open position, i.e. provides sufficient resistance so as to counteract the weight of the door 20 and allow the door 20 to remain in the open position unless a sufficient force toward the closed position is applied to it. The damper 60 may have any suitable configuration, including, but not limited to, any suitable type of rate control damper which can control motion through tension and compression. Suitable rate control dampers may be fully mechanical, gas-charged or hydraulic, among other possibilities.

In a particular embodiment, a similar hinge assembly 30 is provided in the opposite side wall of the bin 10, so that the door 20 is retained by two hinge arms 54, i.e. on hinge arm 54 on each side of the door 20. The additional hinge assembly includes wall panels 32, 34, a pivot 50 and a hinge arm 54 similar to that previously described and shown. The additional hinge assembly may also include a damper 60; alternately, a single damper may be used to retain the door in the open position.

Figure 7:
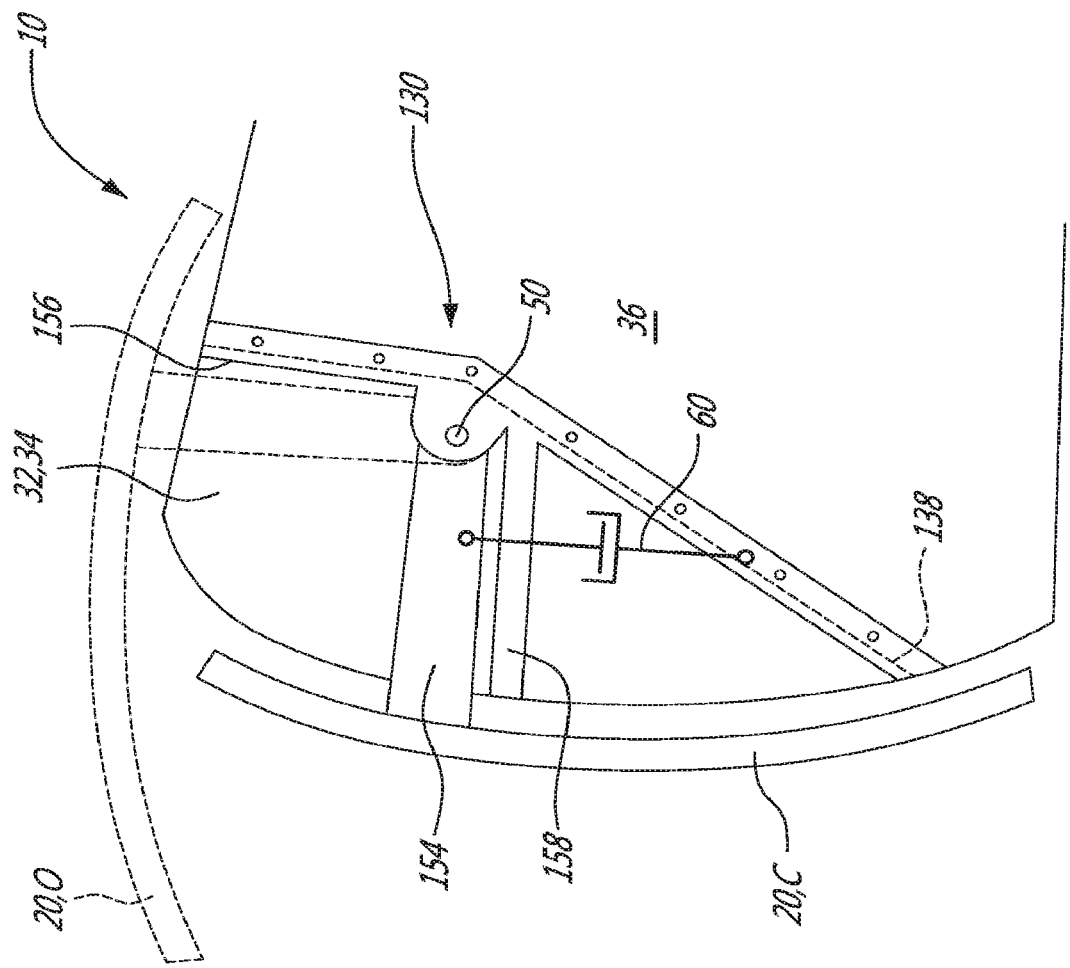
FIG. 7 is a cross-sectional view of a hinge assembly in accordance with another particular embodiment which may be used with the overhead bins of FIG. 2.

Referring to FIG. 7, a hinge assembly 130 in accordance with another particular embodiment is shown. Elements similar to that of the embodiment of FIGS. 3-6 are identified by a same reference numeral and will not be further described herein.

In this embodiment, the cut-out 138 defined along the edge of the wall body 36 is larger, so that the hinge arm 154 does not come into contact with the wall body 36 at the closed position. One or both of the wall panels 32, 34 (only one being visible in FIG. 7) accordingly define the stop 158 abutting the hinge arm 154 at the closed position. The stop 156 abutting the hinge arm 154 at the open position is defined by one or both of the wall panels 32, 34, in proximity of the edge of the cut-out 138 in the wall body 36.

In this embodiment, the wall panels 32, 34 are integrally connected to each other, forming part of a monolithic structure. The edge of the wall body 36 is accordingly inserted between the two wall panels 32, 34 before connecting the wall panels 32, 34 to the wall body 36, for example using 42 fasteners as shown in FIG. 6.

A similar hinge assembly 130 may also be provided in the opposite side wall of the bin 10, as described above.

In a particular embodiment and in use, the door 20 is accordingly connected to the wall 22 in accordance with the following. The receiving space 44 is defined along the edge of the wall forming part of the perimeter of the opening 18 to be closed by the door 20. The hinge arm 54, 154 is pivotally connected to the pivot 50 extending within the receiving space 44 so that the hinge arm 54, 154 is pivotable within a plane aligned with the wall 22. The door 20 is connected to the hinge arm 54, 154.

In a particular embodiment, the receiving space 44 is defined by attaching the wall panels 32, 34 to the wall body 36. In an alternate embodiment, the wall panels 32, 34 may be an integral part of the wall body 36, and the receiving space 44 may be defined for example by removing part of a core extending between the wall panels 32, 34.

In a particular embodiment, an additional receiving space 44 is defined along the edge of an opposite wall 22, and another hinge arm 54, 154 is pivotally connected to a pivot 50 extending within the additional receiving space 44 so that the other hinge arm 54, 154 is pivotable within a plane aligned with this wall 22. The door 20 is connected to both hinge arms 54, 154.

In a particular embodiment, the hinge assembly 30, 130 advantageously allows for support of the door 20 without causing an obstruction in the storage space 16, since the hinge arm 54, 154 remains outward of the inner wall surface 22i of the corresponding wall 22, and the structure supporting the hinge arm 54, 154 is also provided outward of the inner wall surface 22i. The only protrusion of the hinge assembly 30, 130 within the storage space 16 corresponds to the thickness of the inner wall panel 32 where it is attached to the inner surface 22i of the wall body 36. However, the panel thickness is a negligible dimension when compared to the width W of the storage space 16. Accordingly, substantially the entire width W of the storage space 16 remains available for storage.

Alternately, an indentation may be defined in the wall body 36 at the connection with the inner wall panel 32, so that the inner surface of the inner wall panel 32 is aligned with the inner surface 22i of the wall body 36. In that case, the entire width W of the storage space 16 remains available for storage.

By contrast, prior art hinges connected to the inner surface of the wall and protruding within the storage space can have a width of for example 1 inch, which for an embodiment where hinges are provided on both sides of the door, creates a 2 inch obstruction to the usable width of the storage space 16. The hinge assembly 30, 130 can thus allow for an improved storage capacity for the bin 10.

Although described as used with an aircraft storage bin 10, it is understood that the hinge assembly 30, 130 can be used with other types of storage spaces, including, but not limited to, with a galley door.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A hinge assembly for receiving a door, the hinge assembly comprising:
   a wall comprising:
      a wall body defining:
         an inner surface, and
         an outer surface that is opposed to the inner surface; and
      a wall panel extending from one of the inner surface and the outer surface and defining part of a perimeter of an opening closable by the door;
   a pivot connected to the wall panel and defining a pivot axis intersecting the wall panel; and
   a hinge arm having a portion engaged to the pivot and extending away from the wall panel, wherein
   the hinge arm pivotable about the pivot axis is movable within a plane extending between the inner surface and the outer surface between a closed position where the door closes the opening and an open position where the door is away from the opening and the opening is accessible such that the door moves upwardly from a closed position to an open position.

2. The hinge assembly according to claim 1, wherein a cutout surface is disposed at a front side of the wall body facing toward the opening, and
   the wall panel covers a space between the cutout surface and the perimeter of the opening.

3. The hinge assembly according to claim 2, wherein the cutout surface is at a top of the wall body.

4. The hinge assembly according to claim 1, wherein the hinge arm does not protrude across the inner surface of the wall body.

5. The hinge assembly according to claim 1, wherein a top end of the door moves back away from the perimeter of the opening when the door moves from the closed position to the open position.

6. The hinge assembly according to claim 1, further comprising a stop that abuts the hinge arm when the door is at the closed position.

7. The hinge assembly according to claim 1, further comprising: a stop that abuts the hinge arm when the door is at the open position.

8. The hinge assembly according to claim 1, wherein the wall panel is detachably connected to the wall body.

9. The hinge assembly according to claim 1, further comprising a damper pivotally connected to the hinge arm and to the wall panel.

10. The hinge assembly according to claim 1, wherein the hinge arm is connected to the door via a connection portion.

11. A storage bin comprising:
   the hinge assembly according to claim 1;
   a connection portion that connects the hinge assembly to the door; and
   the door.

12. A hinge assembly that connects a door that closes an opening of an overhead storage bin in an aircraft with a wall of the overhead storage bin, the hinge assembly comprising:
   a hinge arm that moves in a pivoting motion around a pivot axis when the door opens and closes the opening, wherein
   the wall has:
      an inner surface that faces toward storage space of the overhead storage bin; and
      an outer surface that faces away the storage space and that is substantially parallel to the inner surface,
   the hinge arm remains entirely within a space between a plane of the inner surface of the wall and a plane of the outer surface of the wall throughout the pivoting motion of the hinge arm between a closed position where the door closes the opening and an open position where the door is away from the opening and the opening is accessible, and
   the pivot axis is away from the door such that the door moves upward and away from the opening when the door opens the opening.

13. The hinge assembly according to claim 12, wherein the space is between the wall and the door at the closed position, and
   the hinge arm is disposed entirely within the space.

14. The hinge assembly according to claim 13, further comprising:
   a wall panel that is fixed to one of the inner surface or the outer surface and that overlaps the space when viewed in a direction of the pivot axis.

15. The hinge assembly according to claim 13, wherein the space is disposed above a top of the wall.

16. The hinge assembly according to claim 12, further comprising a stop that abuts the hinge arm when the door is at the closed position.

17. The hinge assembly according to claim 12, further comprising a stop that abuts the hinge arm when the door is at the open position.

18. The hinge assembly according to claim 12, wherein the hinge arm is connected to the door via a connection portion.

19. A storage bin comprising:
   the hinge assembly according to claim 12;
   a bin body that defines the storage space and the opening for accessing the storage space and that comprises the wall;
   a pivot defining the pivot axis intersecting the plane of the inner surface and the plane of the outer surface;
   a connection portion that connects the hinge assembly to the door; and
   the door, wherein pivoting of the hinge arm moves the door between the closed position and the open position.

* * * * *